United States Patent [19]

Oohashi et al.

[11] Patent Number: 5,276,669
[45] Date of Patent: Jan. 4, 1994

[54] SYNCHRONOUS RECORDING AND PLAYBACK OF LEFT AND RIGHT STEREO CHANNELS ON SEPARATE DIGITAL DISCS

[75] Inventors: Tsutomu Oohashi, 1308, Toyama 2-27, Shinjuku-ku, Tokyo; Moritada Niitsu, Tokyo, both of Japan

[73] Assignees: The Tokyo Electric Power Co., Inc.; Tsutomu Oohashi, Japan

[21] Appl. No.: 511,464

[22] Filed: Apr. 20, 1990

[30] Foreign Application Priority Data

Apr. 21, 1989 [JP] Japan .................. 1-100315
Apr. 21, 1989 [JP] Japan .................. 1-100316

[51] Int. Cl.$^5$ ........................ G11B 3/74; G11B 7/20
[52] U.S. Cl. ........................ 369/86; 369/93
[58] Field of Search .............. 369/86, 93, 94, 95, 369/32, 89, 92; 358/142; 360/22, 77.05, 77.07, 77.08, 77.11, 47, 73.02

[56] References Cited

U.S. PATENT DOCUMENTS

| | | | |
|---|---|---|---|
| 3,394,235 | 7/1968 | Schott | 369/86 |
| 4,320,486 | 3/1982 | Cooley et al. | 369/14 |
| 4,748,669 | 5/1988 | Klayman | 369/86 |
| 4,788,671 | 11/1988 | Kanda | 369/14 |
| 4,873,679 | 10/1989 | Murai et al. | 369/93 |
| 4,876,719 | 10/1989 | Nakagami et al. | 369/1 |

FOREIGN PATENT DOCUMENTS

| | | | |
|---|---|---|---|
| 58-201500 | 11/1983 | Japan | 369/86 |
| 63-173269 | 7/1988 | Japan | 369/86 |

Primary Examiner—Tommy P. Chin
Assistant Examiner—Thai Tran
Attorney, Agent, or Firm—Marger, Johnson, McCollom & Stolowitz

[57] ABSTRACT

A disc recording device for recording left channel signals and right channel signals having a super audio-frequency signal range up to 40 kHz on a left master disc and a right master disc respectively comprises a left disc recording control portion, a right disc recording control portion, and a common control portion. An another disc recording device for recording the left channel signals and the right channel signals having sounds of super audio-frequency signal range up to 40 kHz onto one face and other face of a master disc respectively comprises a disc inverse face playback control portion, a disc front face playback control portion, and a common control portion. A signal frame as a channel bit used in the above mentioned devices has 316 bits per one left channel signal and one right channel signal, respectively.

8 Claims, 10 Drawing Sheets

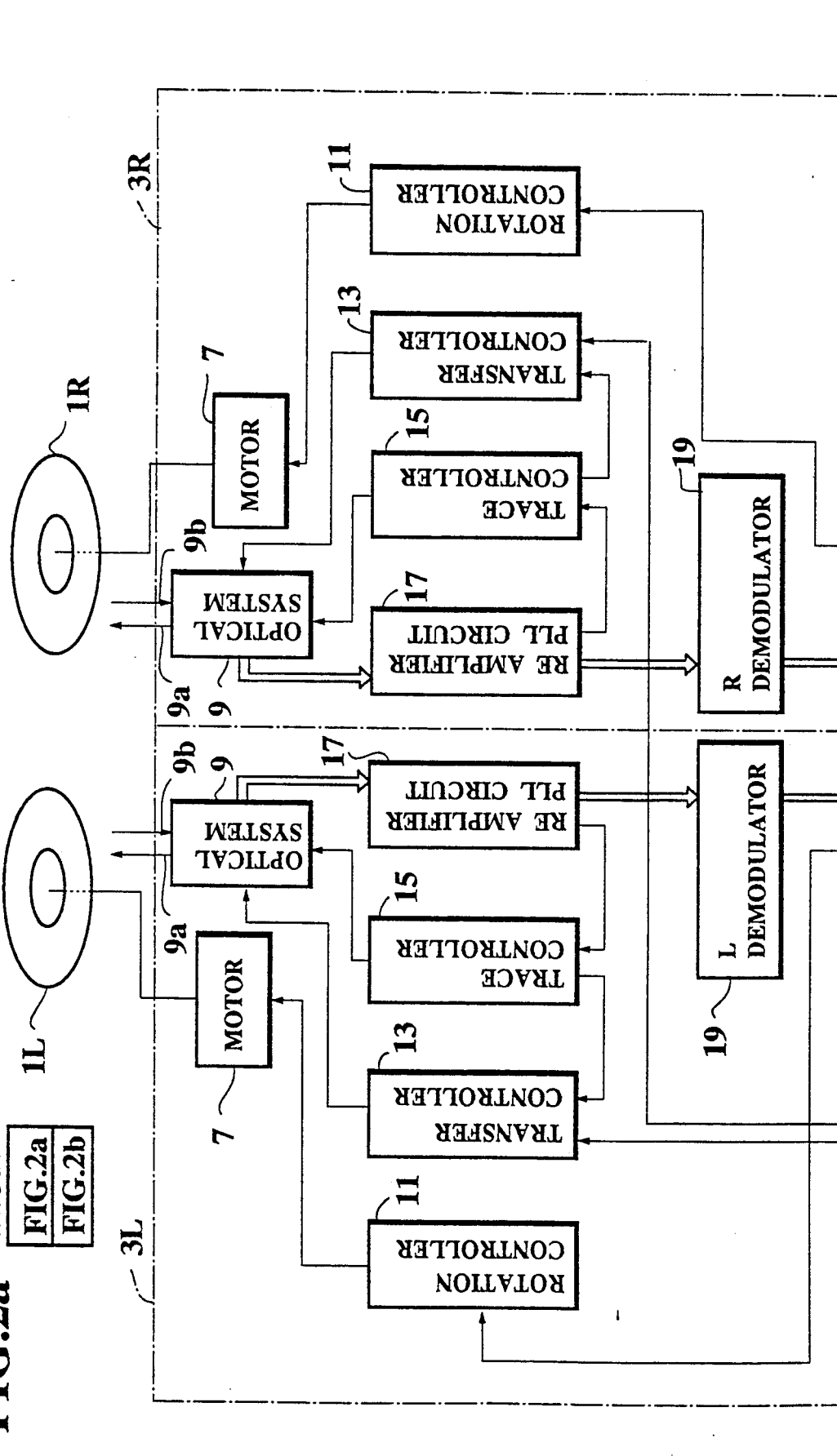

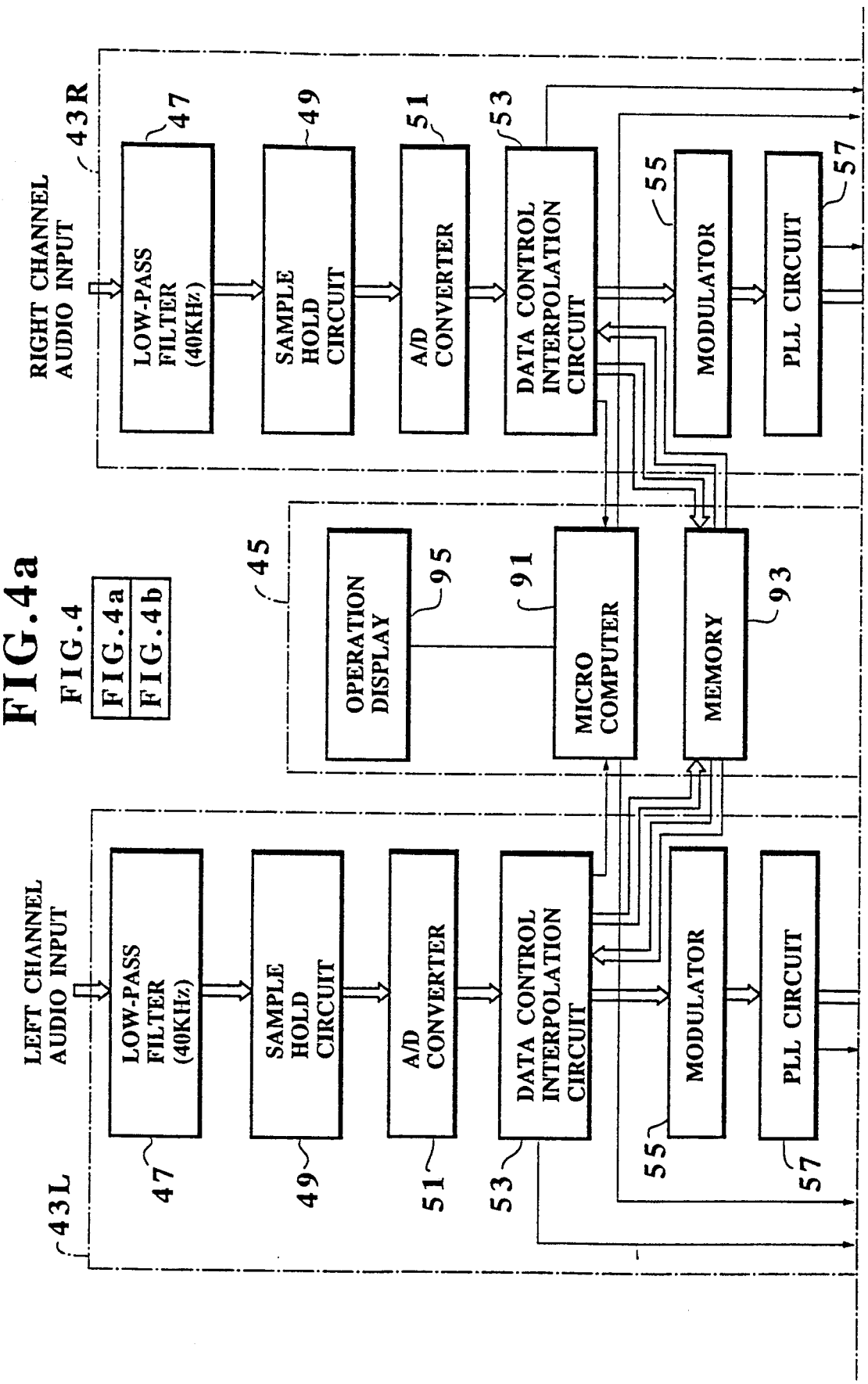

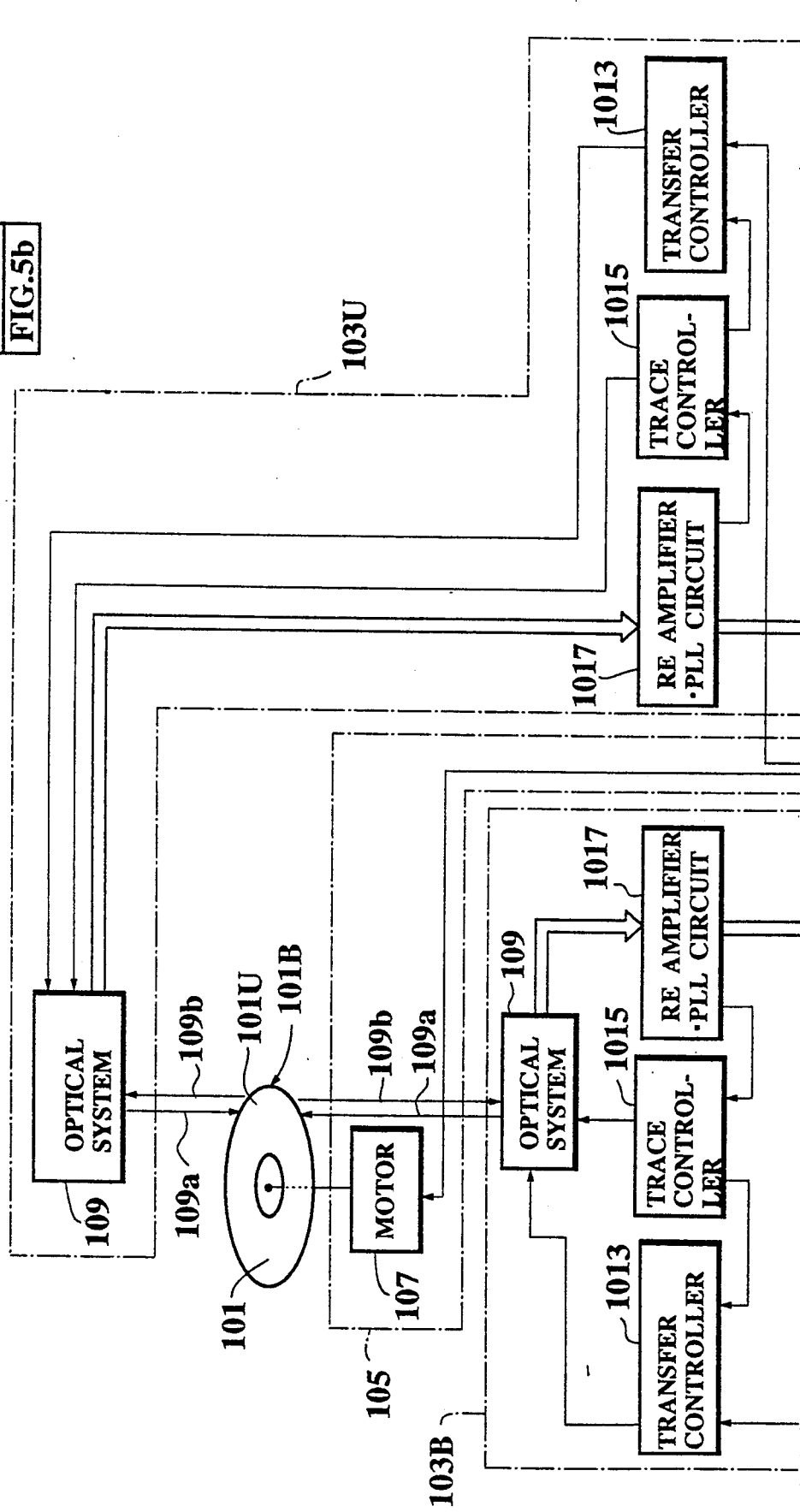

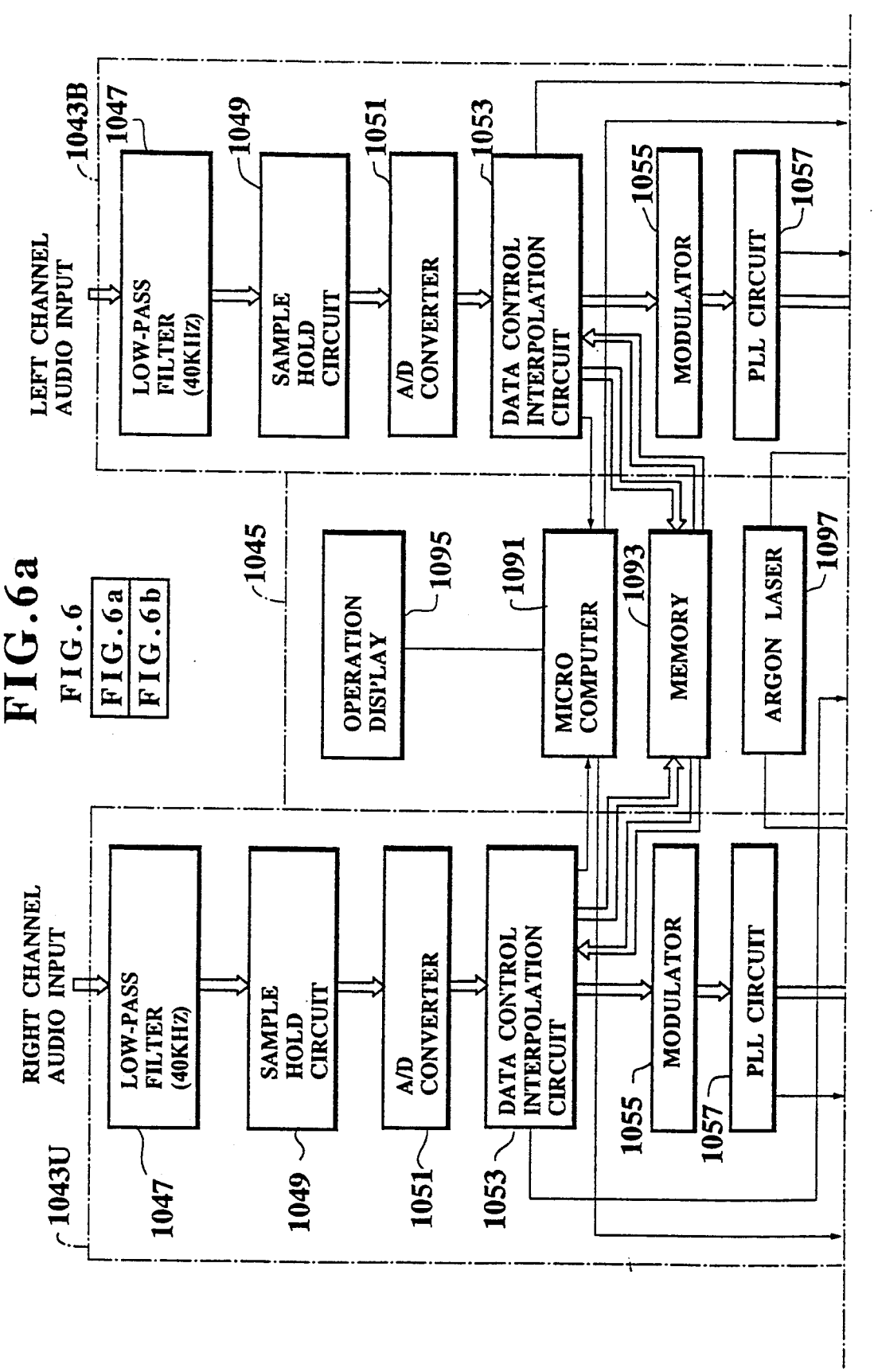

SYNCHRONOUS RECORDING AND PLAYBACK OF LEFT AND RIGHT STEREO CHANNELS ON SEPARATE DIGITAL DISCS

BACKGROUND OF THE INVENTION

1. Field of the Invention

This invention relates to a disc playback device and a disc recording device, and more particularly to a disc playback device for playback of discs in which sound having a super audio-frequency signal range up to 40 kHz have been already recorded into separate left channel signals and right channel signals respectively and a disc recording device for recording sounds having a super audio-frequency signal range up to 40 kHz which is also separated into left channel signals and right channel signals up to 40 kHz onto a disc.

2. Description of the Prior Art

CD (compact disc) as a digital audio disc has great advantages, for example a high quality sound, an improved dynamic range and a decreased distortion when compared to a conventional record such as LP (long-playing record). Moreover, the CD is a small-sized recording medium. Thereby the CD is the most widely applied to deal with the digital audio disc. In addition, the CD can be executed with high concentration recording in which left channel signals and right channel signals of audio-frequency signal range up to about 20 kHz are recorded by using a sampling frequency of nearly 44 kHz. The signals can be recorded for a maximum of 70 minutes per a CD. In the CD, the left channel signals and the right channel signals are recorded under a state in which these signals are composed of a plurality of frames as channel-bits transformed from data-bits having 264 bits per one data-bit to channel-bits having 588 bits per one frame by using EFM (Eight to fourteen modulation) as shown in FIG. 1. The channel bit (588 bits) is composed of a frame syncronism pattern (24 bits and 3 bits for connection), a users-bit (14 bits and 3 bits for connection), two information-bits (168 bits and 36 bits for connection) and two error correction bits (56 bits and 12 bits for connection) for one left channel signal and one right channel signal.

In this case, a bit-rate is about 1.936 Mbit/sec. Namely, the sound of the audio-frequency is recorded in the conventional CD by using the signal frame of 588 bits per one signal frame. This makes it difficult to record sound with audio-frequencies of more than 20 kHz.

While, they say that it is difficult for a person to hear sound over 20 kHz. The sound is transmitted to the brain through the skin near the ears and the skeletons of inner ears, thereby it is known that α-waves are increased in the brain of a person by hearing the sound of audio-frequency signal range over 20 kHz.

As mentioned above, it is difficult to record the sound of the audio-frequency signal range over 20 kHz by using signal frames comprising 588 bits per one frame. Recently, there have been strong demands for extending sounds having a super audio-frequency signal range to about 40 kHz for increasing the α-waves in the brain of a person.

SUMMARY OF THE INVENTION

The present invention is invented in the light of the above mentioned problem. An object of this invention is to provide a disc playback device and a disc recording device for playback of and recording of signals having a super audio-frequency signal range by using signals of the sounds separated into left-channel signals and right-channel signals.

To achieve the object according to the present invention, a first embodiment of the invention uses a disc playback device which left channel signals and right channel signals having a super audio-frequency signal range are recorded on a left channel disc and a right channel disc respectively. The system comprises a left rotation means and a right rotation means for rotating the left channel disc and the right channel disc respectively, a synchronous means for synchronising with the left rotation means and the right rotation means, a left channel signal read means and a right channel signal read means for reading out the left channel signals and the right channel signals recorded on the left channel disc and the right channel disc under a synchronising condition by the left rotation means and the right rotation means respectively, a left channel signal demodulate means and a right channel signal demodulate means for demodulating the left channel signals and the right channel signals read out by the left channel signal read means and the right channel signal read means respectively. Finally, a left channel signal amplification means and a right channel signal amplification means for amplification of the left channel signals and the right channel signals demodulated by the left channel signal demodulate means and the right channel signal demodulate means respectively and then output them.

Namely, in the disc playback device of the first embodiment, a disc used for playback is separated into the left channel disc and the right channel disc for the left channel signals and the right channel signals having a super audio-frequency signal range up to 40 kHz respectively. The left channel signals and the right channel signals having been already recorded on the left channel disc and the right channel disc are read out respectively under a state in which they are rotated in synchronization with each other by the synchronous means and then demodulated and amplified.

A disc recording device according to the second embodiment of the invention, records left channel signals and right channel signals on a left master disc and a right master disc respectively. The disc recording device comprises a left channel signal modulate means and a right channel signal modulate means for modulating the left channel signals and the right channel signals to be recorded respectively, a left disc rotation means and a right disc rotation means for rotating the left master disc to record the left channel signals modulated and the right master disc to record the right channel signals modulated in synchronization with each other, a laser means for irradiating a laser beam for recording the left channel signals modulated and the right channel signals modulated onto the left master disc and the right master disc, while the discs rotate in synchronization with each other by the left disc rotation means and the right disc rotation means. The system also comprises a left channel signal light-modulate means and a right channel signal light-modulate means for light-modulation of the laser beam output from the laser means in response to the left channel signals modulated and the right channel signals modulated output from the left channel signal modulation means and the right channel signal modulation means respectively, and a left optical-system and a right optical-system for recording the left channel signals modulated and the right channel signals modulated on predetermined positions of the left master disc and the right master disc by irradiating the laser beam corresponding to the left channel light-modulated signals and the right channel light-modulated signals by the left channel signal light-modulate means and the right channel signal light-modulate means respectively.

Namely, in the disc recording device of the second embodiment, a master disc is separated into the two master discs which are composed of the left master disc for recording the left channel signals and the right master disc for recording the right channel signals. Moreover, the left channel signals and the right channel signals to be recorded have a super audio-frequency signal range up to 40 kHz and are modulated by the left channel signal modulate means and the right channel signal modulated means respectively while rotating these two master discs in synchronization with each other by the left disc rotation means and the right disc rotation means. Then the laser beam corresponding to the left channel signals modulated and the right channel signals modulated are light-modulated and then recorded on predetermined positions of the left master disc and the right master disc through the left optical system and the right optical system respectively.

A disc playback device of the third embodiment of the invention comprises left channel signals and right channel signals read out from one face and other face of a single disc respectively in which the left channel signals are recorded on the one face of the disc and the right channel signals are recorded on the other face of the disc respectively. The embodiment comprises a rotation means for rotating the disc, a left channel signal read means and a right channel signal read means for reading out the left channel signals recorded on the one face of the disc and the right channel signals recorded on the other face of the disc rotated by the rotating means respectively at the same time, a left channel signal demodulate means and a right channel signal demodulate means for demodulation of the left channel signals and the right channel signals read out by the left channel signal read means and the right channel signal read means respectively, and a left channel signal amplifier means and a right channel signal amplifier means for amplification of the left channel signals and the right channel signals demodulated by the left channel signal demodulation means and the right channel signal demodulation means respectively and outputting these signals.

Namely, in the disc playback device according to the third embodiment, the left channel signals and the right channel signals having a super audio-frequency signal range up to 40 kHz recorded on both the one face and the other face of the disc are read out respectively and then demodulated and amplified and finally output.

A disc recording device according to the fourth embodiment of the invention for recording left channel signals and right channel signals on one face and other face of a master disc respectively, comprises a left channel signal modulate means and a right channel signal modulate means for modulation of the left channel signals and the right channel signals to be recorded respectively, a rotation means for rotating the master disc in which the left channel signals modulated are recorded on the one face and the right channel signals modulated are recorded on the other face, and a laser means for outputting laser beams to the one face and the other face of the master disc rotated by the rotation means to record the left channel signals modulated and the right channel signals modulated respectively. The embodiment also comprises a left channel signal light-modulate means and a right channel signal light-modulate means for light-modulation of the laser beam output from the laser means in response to the left channel signals modulated and the right channel signals modulated output from the left channel signal modulate means and the right channel signal modulate means respectively, and a left channel optical-system and a right channel optical-system for recording the left channel signals modulated and the right channel signals modulated on predetermined positions of the one face and the other face of the master disc by irradiating the laser beams corresponding to the left channel light-modulated signals and the right channel light-demodulated signals.

In the above described embodiments, the left channel signals and the right channel signals composed of signal frames of 588 bits per one frame are used in the disc playback device and the disc recording device. The signal frame length is about half that used in the conventional disc playback device and the conventional disc recording device. Thereby a frequency of sounds having super audio-frequency signals up to 40 kHz, can be played and recorded.

Various modifications will become apparent for those skilled in the art after receiving the teachings of the present disclosure without departing from the scope thereof.

BRIEF DESCRIPTION OF THE DRAWINGS

FIG. 2 comprises FIG. 2a and 2b.

FIGS. 2a and 2b are a block diagram showing a composition of a disc playback device according to the first embodiment of the invention.

FIG. 4 comprises FIG. 4a and FIG. 4b.

FIGS. 4a and 4b are a block diagram showing the composition of a disc recording device according to the second embodiment of the invention.

FIG. 5 comprises FIG. 5a and FIG. 5b.

FIGS. 5a and 5b are a block diagram showing the composition of a disc playback device according to the third embodiment of the invention.

FIG. 6 comprises FIG. 6a and FIG. 6b.

FIGS. 6a and 6b are a block diagram showing the composition of a disc recording device according to the fourth embodiment of the invention.

DETAILED DESCRIPTION OF THE EMBODIMENTS

Hereinafter, embodiments of the invention will now be explained in detail with reference to the drawings.

Figure 2B:
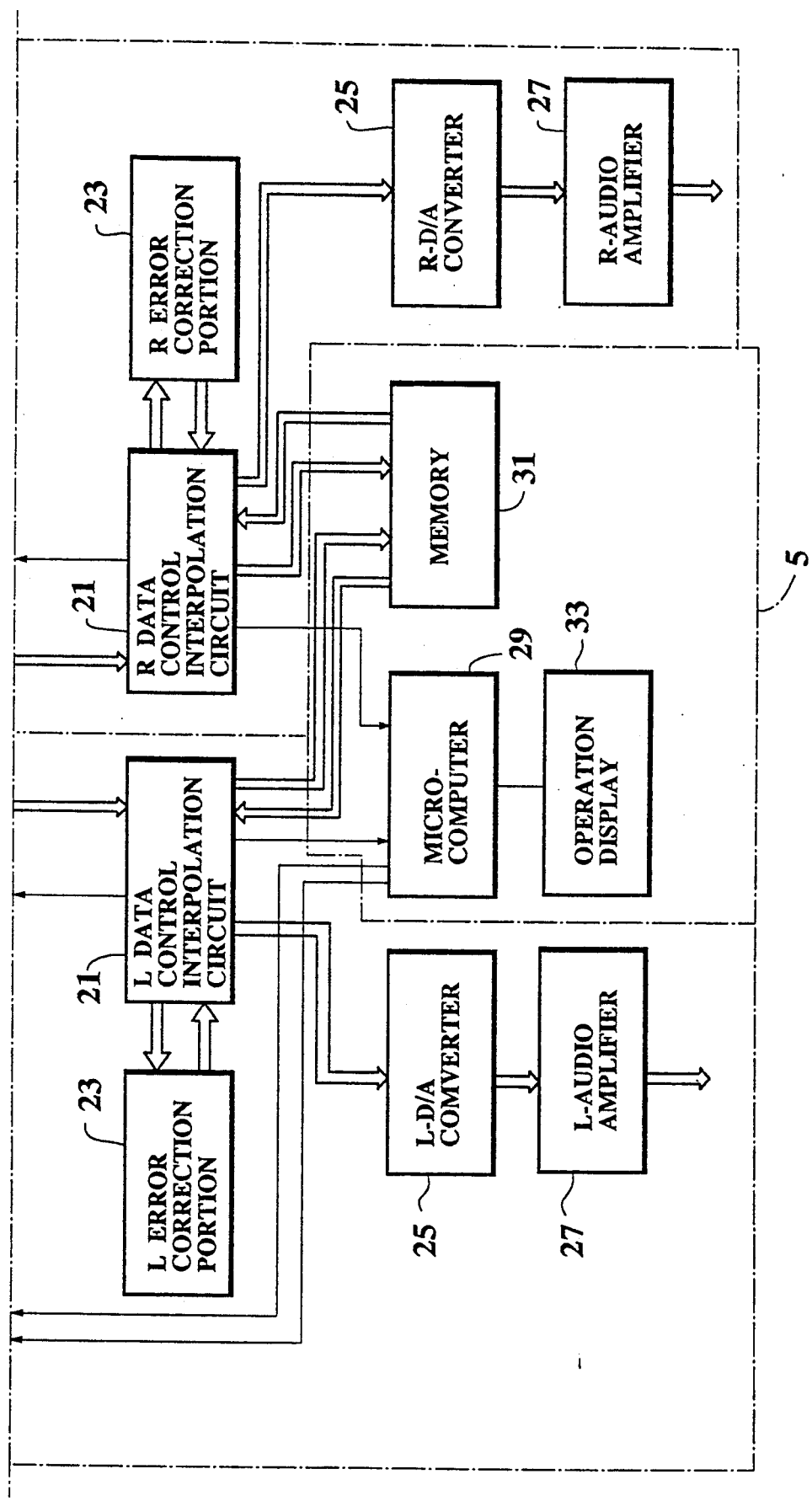

FIGS. 2a and 2b are a block diagram showing a composition of a disc playback device according to the first embodiment of the invention.

A left channel disc 1L (hereinafter only called left disc) containing recorded left channel signals and a right channel disc 1R (hereinafter only called right disc) containing recorded right channel signals are used in the disc playback device as shown in FIGS. 2a and 2b. Accordingly, the disc playback device can playback the left disc 1L and the right disc 1R respectively. The disc playback device comprises mainly a left disc playback control portion 3L for playback of the left channel signals recorded in the left disc 1L, a right disc playback control portion 3R for playback of the right channel signals recorded in the right disc 1R, and a common control portion 5 for controlling the left disc playback control portion 3L and the right disc playback control portion 3R. Moreover these signals recorded on the left disc 1L and the right disc 1R are written with signal frames in which a left channel signal and a right channel signal are transformed from a data bit to a signal frame channel bit by the EFM respectively. The data bit (136 bits) comprises a users bit (8 bits), a information bit (6 words: 12 symboles: 96 bits) per the left channel signal and the right channel signal respectively, and a error correction bit (32 bits). The channel bit of the signal frame is composed of a frame synchronism pattern (24 bits and 3 bits for connection), a users bit (14 bits and 3 bits for connection), a information bit (168 bits and 36 bits for connection) per the left channel signal or the right channel signal, and a error correction bit (56 bits and 12 bits for connection).

Figure 3:
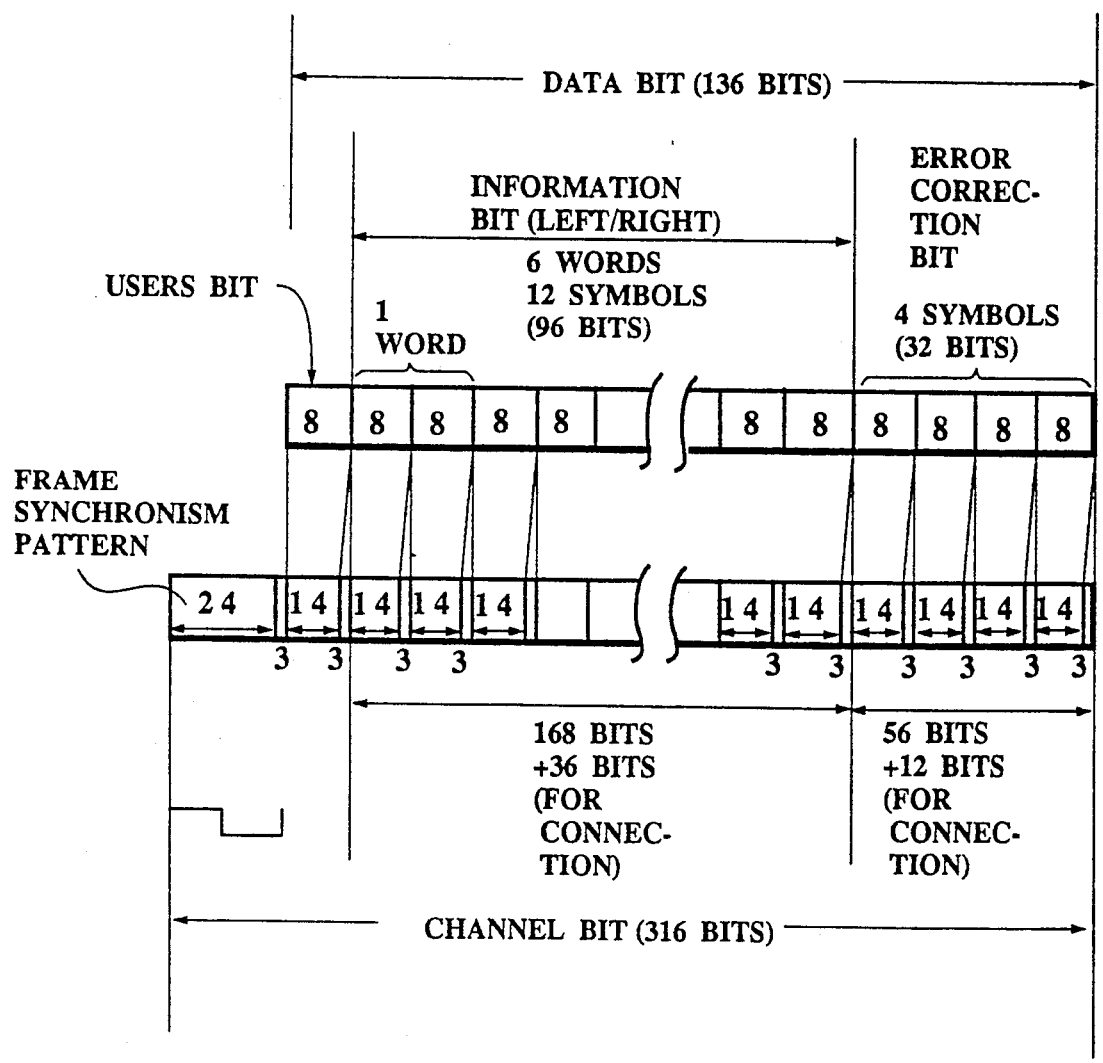
FIG. 3 is a diagram showing a format of a signal frame channel bit recorded in a right channel disc and a left channel disc after playback by the disc playback device shown in FIGS. 2a and 2b.

The left disc playback control portion 3L and the right disc playback control portion 3R have the same composition. Namely, the control portions 3L and 3R respectively comprise a motor 7 for rotating the left disc 1L and the right disc 1R, and a optical system 9 for reading out the signals recorded on the left disc 1L and the right disc 1R by detecting the reflected light 9b returned from the left disc 1L and the right disc 1R generated by irradiating incident light 9a within optical systems 9 respectively. Moreover the motor 7 is controlled by a rotation control portion 11. The optical system 9 is controlled as to the radial direction of the disc 1L and of the disc 1R respectively by the transfer control portion 13. Focus and tracking control of the left disc 1L and the right disc 1R are carried out by a trace control portion 15 respectively. The left channel signals and the right channel signals read out from the left disc 1L and the right disc 1R by the optical system 9 are amplified by a RE amplifier and a PLL (phase-locked loop) circuit 17 respectively. The left channel signals and the right channel signals amplified are provided to the demodulation circuits 19 respectively. In the demodulation circuits 19, the left channel signals and the right channel signals read out from the left disc 1L and the right disc 1R respectively are demodulated and then transformed into data-bits as shown in FIG. 3. Then the data-bits are transferred to the data control interpolation circuits 21. In the data control interpolation circuits 21 and the error correction portions 23, the data-bits are processed for error-correction and interpolation and then provided to a D/A (digital to analog) convertor 25. The data-bits carried out of the error detection correction interpolation process are transformed into analog signals by the D/A converter 25 and then amplified by the audio-amplifiers 27 and finally output through a left channel speaker and a right channel speaker respectively (not shown).

Moreover, the common control portion 5 comprises a microcomputer 29, a memory 31 and a operation display 33. The control of error detection correction interpolation procedure of the demodulation data through the data control interpolation circuits 21, rotation of the motors 7 through rotation control portions 11, and other various processing are executed by the microcomputer 29 and the memory 31. The operation display 33 has operation buttons and pilot lamps et al. Thereby various control operations are executed through the microcomputer 29. Moreover the operation display 33 displays states caused by the various control operations. The motors 7 of the left disc playback control portion 3L and the right disc playback control portion 3R rotate in synchronization with each other under the control of the microcomputer 29 through the rotation control portions 11 and thereby signals read out from the left disc 1L and the right disc 1R are output in synchronization with each other.

Figure 1:
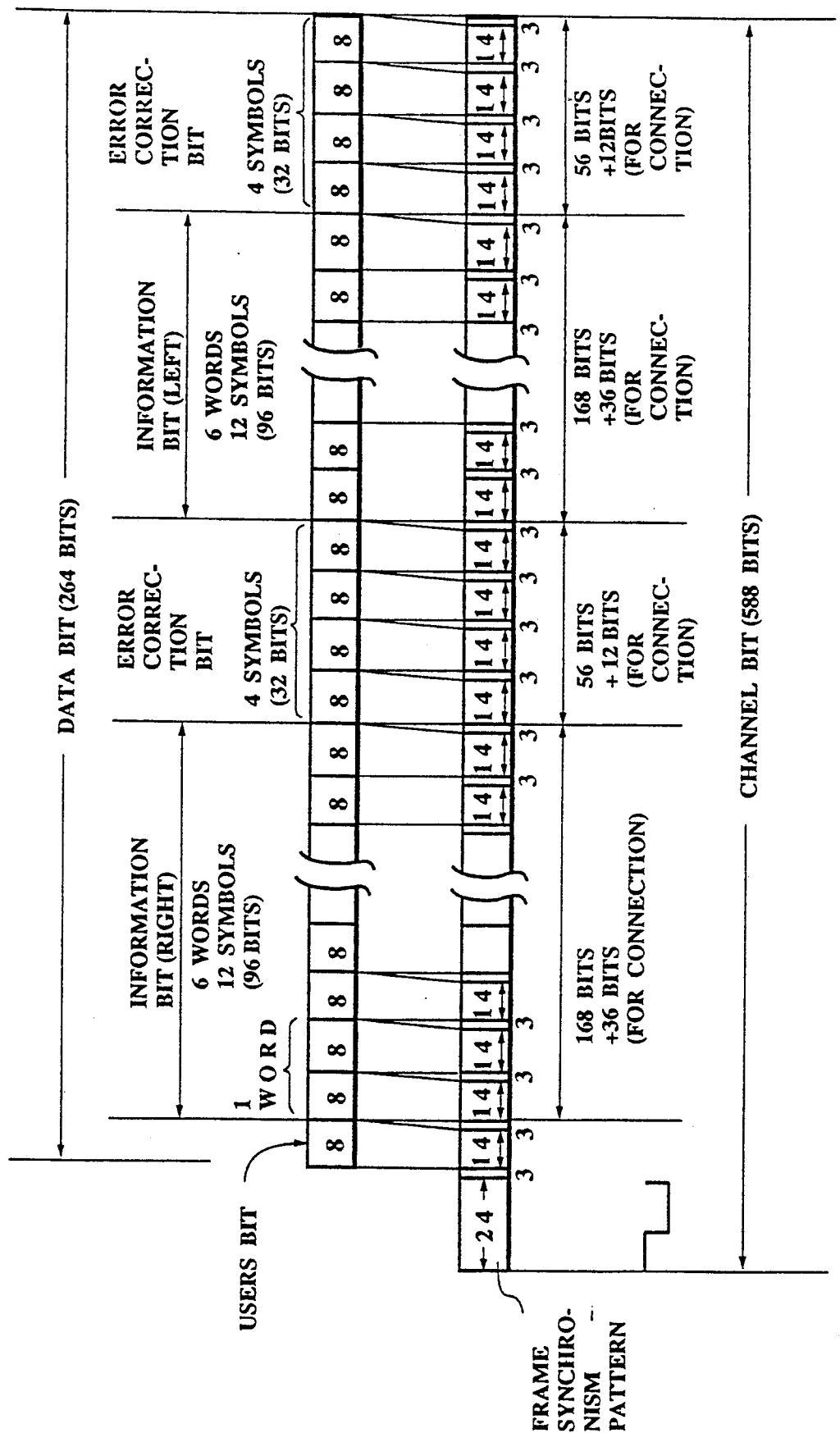
FIG. 1 is a diagram showing a format of a signal frame as channel bit recorded in the conventional disc.

The disk playback device having the above mentioned composition uses the left disc 1L and the right disc 1R on which the left channel signals and the right channel signals have been already recorded respectively. Namely, the left channel signals are recorded on the left disc 1L only and the right channel signals are recorded on the right disc 1R only as shown in FIG. 3. Accordingly, to record both of the left signals and the right signals on one disc is not required in the disc playback device. The length of the signal frame to be recorded for EFM therefore is 316 bits or about half of the length (588 bits) of the conventional signal frame as shown in FIG. 1. By using the disc playback device of the first embodiment, sounds having the super audiofrequency range to about 40 kHz can be playbacked. In this case, the bit-rate is about 997 Mbits/s.

In the disc playback device having the above described composition according to the embodiment, as mentioned above, the left disc 1L and the right disc 1R are recorded with the left channel signals and the right channel signals and are rotated in synchronization with each other under a control of the rotation control portions 11 through the motors 7 in the left disc playback control portion 3L and the right disc playback control portion 3R respectively. Next, the incident lights 9a output from the optical systems 9 are irradiated on the predetermined positions of the left disc 1L and the right disc 1R under the control of the focusing and the tracking performed by the trace control portions 15. Thereby the reflected lights from the left disc 1L and the right disc 1R are detected and then read out by the optical systems 9. The signals read out from the left disc 1L and the right disc 1R are amplified and reproduced by the RE amplifier-PLL circuit 17 and then demodulated by the demodulation circuits 19. Moreover these demodulated signals are corrected for error data by the data central interpolation circuits 21 and the error correction portion 23 and then transformed into left and right analog signals eachby the D/A converters 25 and finally output as the left channel signals and the right channel signals to the left and right speakers (not shown).

Figure 4B:
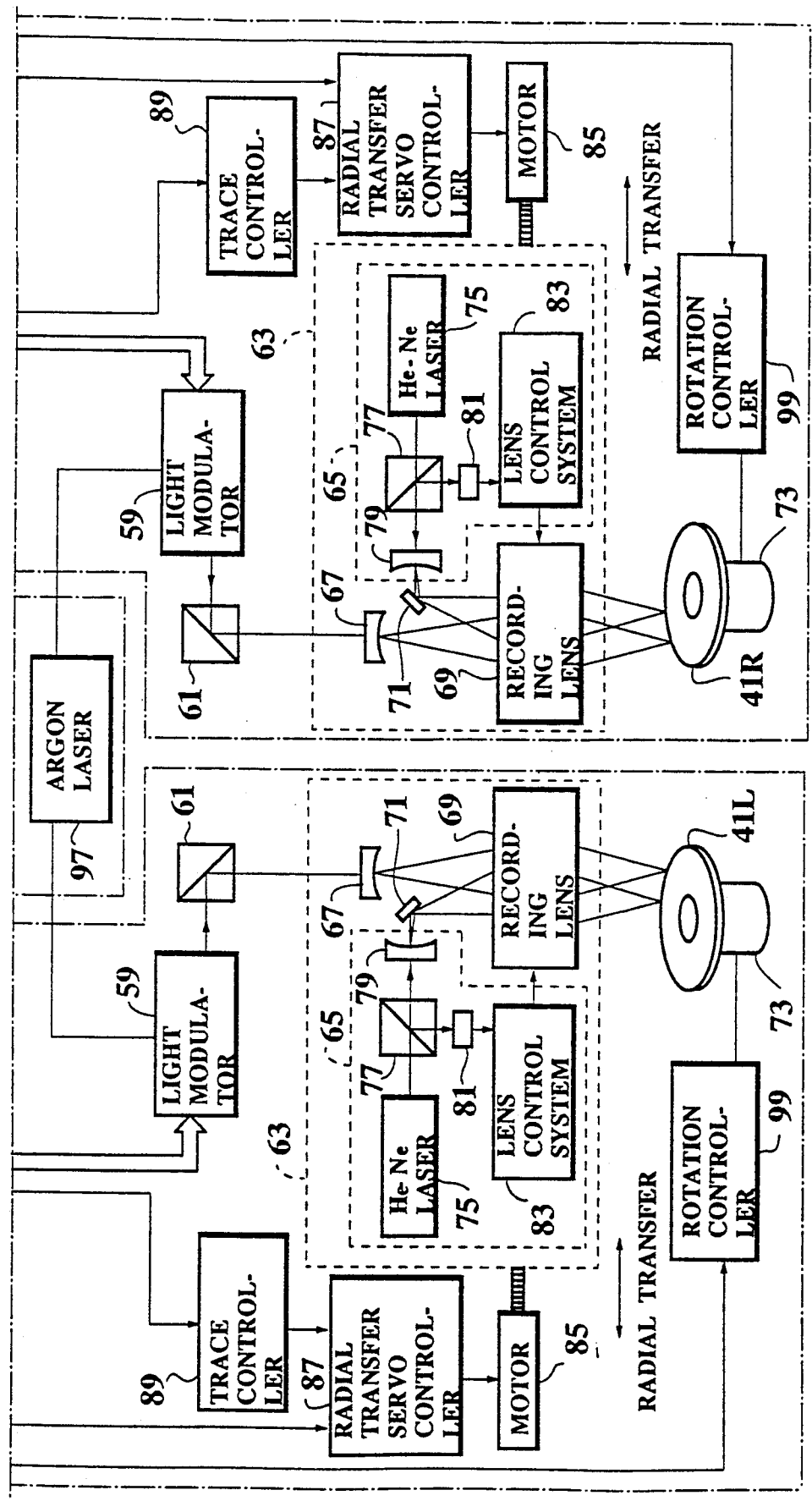

FIGS. 4a and 4b are a block diagram showing a composition of a disc recording device according to the second embodiment of the invention. In the disc recording device as shown in the same diagram, left channel signals are recorded on a left channel master disc 41L (hereinafter only called the left master disc) and right channel signals are recorded on a right channel master disc 41R (hereinafter only called the right master disc). This way, the left channel signals and the right channel signals, are recorded on the left master disc 41L and the right master disc 41R, respectively. The disc recording device of the embodiment comprises a left disc recording control portion 43L for recording the left channel signals, a right disc recording control portion 43R for recording the right channel signals, and common control portion 45 by which both of the control portion 43L and 43R are controlled. The left recording control portion 43L and the right recording control portion 43R have the same composition and includes motors 73 for rotating the left master disc 41L and the right master disc 41R, respectively. The motors 73 are rotated in synchronization with each other by the rotational control portions 99. Further the left channel signals and the right channel signals are recorded into the left master disc 41L and the right master disc 41R respectively through the optical systems 63. Transfer of the radial direction in the left master disc 41L and the right master disc 41R is controlled by radial transfer motors 85 respectively while controlling focusing and the tracking of the optical systems 63 by the trace control portion 89. Moreover, audio input signals to be recorded as the left channel signals and the right channel signals for recording are provided into low-pass filters 47 in the left disc recording control portion 43L and the right disc recording portion 43R, respectively. The audio input signals of not less than 40 kHz are removed by the low-pass filters 47. Then the audio input signals are provided into sample hold circuits 49. Moreover the audio input signals output from the sample hold circuits 49 are transformed into digital signals by A/D (analog to digital) converters 51, respectively. The digital signals from the left channel signals and the right channel signals output from the A/D converters 51 are processed by data control interpolation circuits 53 and then processed by the left channel modulation circuit 55 and the right channel modulation circuit 55, respectively.

The left channel signals modulated and the right channel signals modulated are provided into the light modulate circuits 59 respectively and the trace control portion 89 through the PLL (Phase-locked loop) circuits 57. Light modulate circuits 59, receives a laser beam for recording output from an argon laser 97 in the common control portion 45. The laser beams are modulated using the light modulator circuits 59 in response to the left channel signals and the right channel signals modulated, respectively. The light signals modulated are irradiated on the left master disc 41L and the right master disc 41R respectively through beam splitters 61, the concave lense 67 and the recording lenses 69 in the optical systems 63. Thereby the left channel signals and the right channel signals modulated are recorded on the left master disc 41L and the right master disc 41R respectively. In this way, the focus control of the laser beam irradiated on the left master disc 41L and the right master disc 41R are carried out by the focus servo control portions 65 in the optical systems 63. During irradiation on the left master disc 41L and the right master disc 41R, radial direction and tracking control of the left master disc 41L and the right master disc 41R is carried out by the radial transfer servo control portions 87 and the trace control portions 89 through the radial transfer motors 85.

The focus servo control portion 65 comprises a He-Ne (helium-neon) laser 75, a beam splitter 77 which branches laser beam output from the He-Ne laser, a concave lense 79 and the reflection mirror 71 which irradiates one side of the laser beam branched by the beam splitter 77 into the left master disc 41L and the right master disc 41R respectively through the recording lense 69, a light detector 81 for detecting the second laser beam output from the beam splitter 77, and a lense control system 83 for controlling operation of recording lense 69 processed corresponding to output signals generated from the light detector 81.

Moreover the common control portion 45 comprises a micro computer 91, a memory 93, a operation display 95 and an argon laser 97. Synchronous rotation operation of the motors 73 for the left master disc 41L and the right master disc 41R, various operation of the error detection correction interpolation procedure carried out through the data control interpolation circuit 53, and operation of the entire system are controlled by the micro computer 91 and the memory 93. The operation display portion 95 comprises operational buttons and pilot lamps, and thereby control of various operation is executed through the microcomputer 91. Moreover various states caused by the various operations described above are displayed by the operational display portion 95.

In the disc recording device having the above mentioned composition, the left channel signals are recorded in the left master disc 41L only and the right channel signals are recorded in the right master disc 41R only, similar to the case of the disc playback device according to the first embodiment as shown in FIGS. 2a, 2b and FIG. 3. Therefore it is not required to record both of the left channel signals and the right channel signals on a disc so that a signal frame recording format used in the embodiment is 316 bits (as shown in FIG. 3) or about half of a length (588 bits) of a signal format used in the conventional disc. Accordingly, in the disc recording device according to the second embodiment, the sounds having the super audio-frequency signal range to 40 kHz can be recorded on the left master disc and the right master disc.

Hereinafter, the operation of the disc recording device of the second embodiment shown in FIGS. 4a and 4b will now be described. First, the left master disc 41L and the right master disc 41R are rotated in synchronization with each other by the rotation control portions 99 respectively. At the same time, the left channel signals and the right channel signals for recording are provided into the low pass filters 47 for the left disc recording control portion 43L and the right disc recording portion 43R, respectively. These left and right channel signals are transformed into error corrected channel bits by the sample hold circuits 49, the A/D converters 51, and the data control interpolation circuit portions 53 modulation circuits 55, and the PLL circuits 57. Then, these channel bits are provided into the light modulation circuits 59. In the light modulation circuits 59, laser beams output from the argon laser 97 are light-modulated. The laser beam light-modulated are irradiated on the left master disc 41L and the right master disc 41R through the optical systems 63, respectively. Thereby the left channel signals and the right channel signals light-modulated are recorded on the left master disc 41L and the right master disc 41R respectively.

Moreover, in the operation of the above mentioned recording procedure, positional controls of the radial direction of the left master disc 41L and the right master disc 41R are carried out by the radial transfer motors 85. The focussing control are processed by the focus servo control portions 65.

Figure 5B:
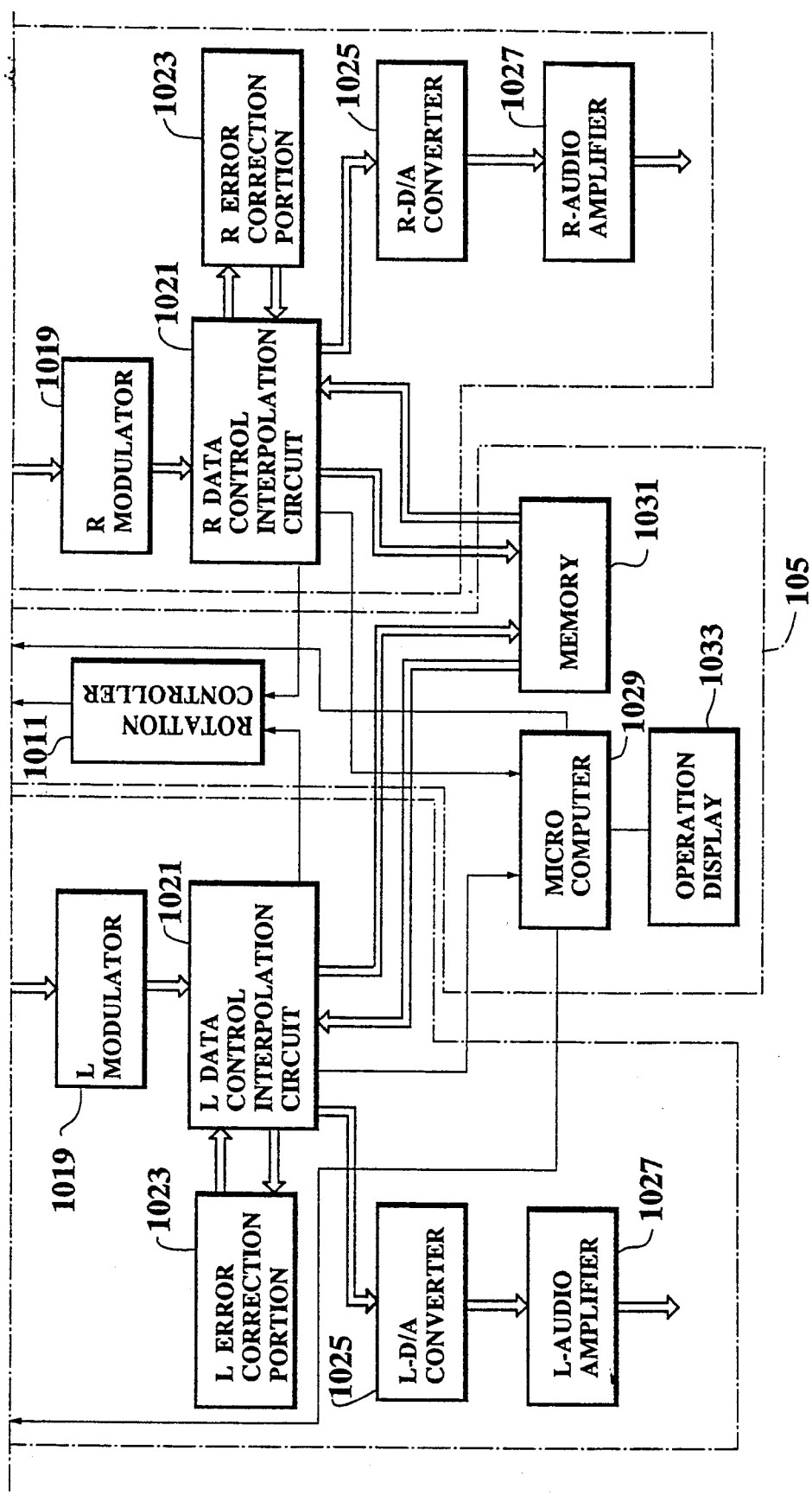

FIGS. 5a and 5b are a block diagram showing a composition of a disc playback device according to the third embodiment of the invention.

In the disc playback device, a disc 101 is used as recording medium in which left channel signals are recorded on the inverse face 101B as one side of the disc 101 and right channel signals are recorded on the front face 101U as another side of the disc 101. Accordingly, the left channel signals and the right channel signals are read out from the both faces of the disk 101 respectively. The disc playback device comprises a disc inverse face playback control portion 103B for playback of the left channel signals recorded on the inverse face 101B of the disc 101, a disc front face playback control portion 103U for playback of the right channel signals recorded on the front face 101U of the disc 101, and common control portion 105 for controlling at the same time both of the control portions 103U and 103B. Moreover, the left channel signals and the right channel signals have been already recorded in EFM state on the inverse face 101B and the front face 101U of the disc 101 respectively. The common control portion 105 comprises a motor 107 for rotating the disc 101, a rotation control portion 1011 for controlling the motor 107, a microcomputer 1029, and operation display 1033 a memory 1031 for processing a error detection correction interpolation procedure and several other types of control. The operation display 1033 includes operation buttons and pilot lamps and thereby various control are executed through the microcomputer 1029. Various states caused by the several types of controls are displayed on the operation display 1033.

The disc inverse face playback control portion 103B and the disc front face playback control portion 103U have a same composition. For example, they include a optical system 109 respectively in which incident light 109a for reading is irradiated on the inverse face 101B and the front face 101U of the disc 101 while the disc is rotating by the motor 107 in the common control portion 105. These recorded signals on the disc 101 are read out by optical method. Moreover, these optical systems 109 are controlled by the transfer of the radial direction of the disc 101 by transfer control portion 1013 respectively and focusing and tracking control of the inverse face 101B and the front face 101U of the disc 101 are performed by trace control portions 1015 respectively. The modulated signals (the left channel signals and the right channel signals) read out from the inverse face 101B and the front face 101U of the disc 101 by the optical systems 109 are amplified after provided into RF amplifier PLL circuits 1017. Then the modulated signals are passed through a clock regeneration procedure and finally provided into the demodulated circuit 1019 respectively.

Immediately after the left channel signals and the right channel signals, for example EFM signals demodulated, are read out from the inverse face 101B and the front face 101U of the disc 101 and transformed into data bits by the demodulation circuits 1019 respectively and then provided into data control interpolation circuits 1021. These data signals demodulated by the demodulation circuits 1019 are processed for detection of error data by the error correction interpolation procedure performed by the data control interpolation circuits 1021 and error correction portions 1023 and then provided into D/A converters 1025.

These signals processed by the error correction interpolation procedure are transformed into analog signals by the D/A converters 1025 and amplified by the audio amplifier 1027 and then output from the left channel speaker and right channel speaker respectively (not shown).

In the disc 101 used for the disc playback device according to the embodiment, the left channel signals and the right channel signals have been already recorded separately on the inverse face 101B and the front face 101U of the disc 101 respectively as shown in FIGS. 5a and 5b. Namely, it is not required that both of the left and the right channel signals are recorded on the same face of the disc and the length of a signal frame with a recording format for the EFM is only 316 bits, as shown in FIG. 3, and is about half of the length (588 bits) of the signal format used in the conventional disc as shown in FIG. 1. Accordingly, signals have a super audio-frequency signal range up to 40 kHz, which is approximately twice as high as the highest audio-frequency signal range (20 kHz) used in the conventional disc. In addition, in this case, the bit rate achieved is about 1.997 Mb/sec.

Hereinafter operation of the disc playback device will be described. In the disc playback device having the above described composition shown in FIGS. 5a and 5b, the disc 101 of which the left channel signals and the right channel signals have been recorded on the inverse face 101B and the front face 101U are rotated under the control of the rotation control portion 1011 through the motor 107 in the common control portion 105 respectively.

Next, the incident lights 109a are irradiated to the predetermined positions on the inverse face 101B and the front face 101U of the disc 101 under the control of the transfer control portion 1013 in the disc inverse face playback control portion 103B and the disc front face playback control portion 103U and furthermore the control of the focusing and tracking is performed by the trace control portion 1015 respectively.

The reflected lights 109b output from the inverse face 101B and the front face 101U of the disc 101 are read out by the optical system 109, respectively. Next these signals read out from the inverse face 101B and the front face 101U of the disc 101 are amplified and then processed by the clock regeneration procedure performed by the RF amplifier PLL circuit 1017. Then, these signals are demodulated by the demodulation circuit 1019 and moreover processed by the data control interpolation circuit 1021 respectively.

Finally these signals are transformed into the left channel analog signals and the right channel analog signals by the D/A converters 1025 and amplified by the audio amplifiers 1027 respectively. These signals amplified as the left channel signals and the right channel signals are output from the left channel speaker and the right channel speaker (not shown), respectively.

Figure 6B:
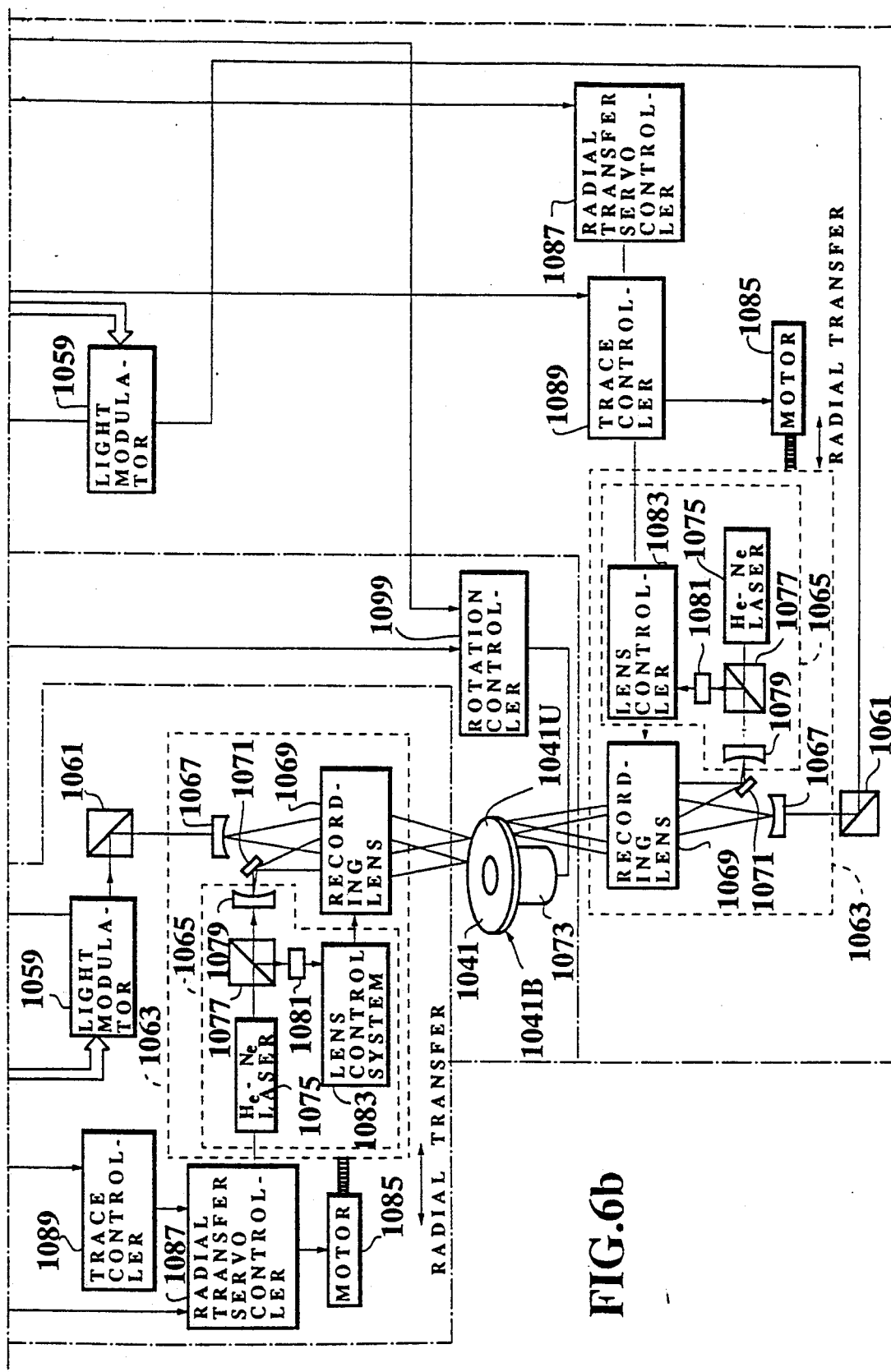

FIGS. 6a and 6b are a block diagram showing a composition of a disc recording device according to the fourth embodiment of the invention. In the disc recording device, left channel signals are recorded on the inverse face 1041B of a master disc 1041 and right channel signals are recorded on the front face 1041U of the master disc 1041.

Namely, the left channel signals and the right channel signals are recorded separately on the inverse face 1041B and the front face 1041U of the disc 1041, respectively.

The disc recording device comprises a disc inverse-face recording control portion 1043B under which the left channel signals are recorded on the inverse face 1041B of the master disc 1041, a disc front-face recording control portion 1043U under which the right channel signals are recorded on the front face 1041U of the master disc 1041, and a common control portion 1045 by which these recording control portions 1043B and 1043U are controlled.

The common control portion 1045 comprises a motor 1073 by which the master disc 1041 is rotated, a rotation control portion 1099 for controlling the rotation of the motor 1073, a microcomputer 1091 and a memory 1093 for controlling several types of control operation and for performing whole control operation, a operation display portion 1095 and a argon-laser 1097. The operation display portion 1095 comprises push buttons and pilot lamps. The several types of controles can be performed by the operation display portion 1095 through the microcomputer 1091. Moreover states caused by the several types of commands are displayed on the operation display portion 1095. Laser beam for recording signals is output on the inverse face 1041B and the front face 1041U of the master disc 1041. Both of the disc inverse face recording control portion 1043B and the disc front face recording control portion 1043U have a same composition and include optical systems 1063 for recording the left channel signals and the right channel signals on the inverse face 1041B and the front face 1041U in the master disc 1041 rotated by the motor 1073 of the common control portion 1045 respectively.

In the optical system 1063, control of the focusing and the tracking are performed by the trace control portion 1089 and at the same time the transfer of the radial direction of the disk 1041 is controlled by the radial transfer motor 1085 from radial transfer servo control portion 1087.

Furthermore, audio input signals of the left channel signals and the right channel signals to be recorded on the inverse face 1041B and the front face 1041U of the master disc 1041 are provided to the low-pass filters 1047 in the disc inverse face recording control portion 1043B and the disc front face recording control portion 1043U respectively and therein the audio input signals not less than 40 kHz are cut. Next, the audio input signals not more than 40 kHz are provided into each of the sample hold circuits 1049 and then transferred to each of the A/D converters 1051 for transforming to digital signals respectively.

In this case, the laser beam irradiated on the inverse face 1041B and the front face 1041U of the disc 1041 are controlled by the focus servo control portions 1065 in the optical systems 1063, respectively. The position control of the radial direction and the tracking control of the master disc 1041 are executed through the radial transfer motors 1085 by the radial transfer servo control portions 1087 and the trace control portions 1089.

In addition, the focus servo control portion 1065 comprises a He-Ne laser 1075, a beam splitter 1077 by which the laser beam out put from the He-Ne laser 1075 is branched, the concave lense 1079 and the reflection mirror 1071 for irradiating one side of the laser beam branched by the beam splitter 1077 on the inverse face 1041B or the front face 1041U of the disc 1041, the light detector 1081 for detecting the other side of the laser beam output from the beam splitter 1077, and a lense control system 1083 for controlling the recording lense 1069 in responce to the signals output from the light detector 1081.

In the disc recording device of the embodiment having the above described composition, the left channel signals are recorded on the inverse face 1041B and the right channel signals are recorded on the front face 1041U of the master disc 1041, respectively. Therefore the length of the signal frame in the channel bit used format for recording is only 316 bits, as shown FIG. 3, which is nearly in half of the length of the signal frame channel bit format recorded in the conventional master disc.

Accordingly, the super audio-frequency signals range up to about 40 kHz (which is nearly twice as high as the highest sonic frequency signals currently capable of being recorded on conventional disc recording device), can be recorded on the inverse face 1041B and the front face 1041U of the master disc 1041 respectively.

Hereinafter, operation of the disc recording device of this embodiment will now be described. In the disc recording device, the left channel signals and the right channel signals to be recorded are provided into the low-pass filters 1047 in the disc inverse face recording control portion 1043B and the disc front face recording control portion 1043U, respectively. Then these signals are transformed into the channel bits by the modulation circuits 1055 and provided to the light modulation circuits 1059 after first being processed through the sample hold circuits 1049, the A/D converters 1051, and data control interpolation circuits 1053 respectively. Then the light modulation for laser beams output from the argon laser 1097 is performed by the modulation signals. The light modulated laser beam is irradiated on the inverse face 1041B and the front face 1041U of the disc 1041 through the beam splitters 1061 and the optical systems 1063, thereby recording the left channel signals and the right channel signals on the inverse face 1041B and the front face 1041U of the disc 1041 respectively. Moreover, in the above described recording operation, the focusing control is executed by the focus servo control portion 1065 and at the same time the position control of radial direction and the tracking control of the disc 1041 are carried out by the radial transfer motors 1085.

When a disc is recorded as shown in the above described embodiment, recording direction of optical tracks of the inverse face and of the front face of the disc are inversely related each other. Accordingly, the starting points of recording in both the inverse face and the front face need to be as close as possible. A little difference between the starting points of the inverse face and the front face of the disc can be modified through the memory 1093. Furthermore, in the above described embodiments, the EFM method is explained. The scope of this invention is not limited to the above mentioned embodiments, but comprises many variations that will be obvious to one skilled in the art. For example, another modulation methods can also be used. The playback and recording methods described in the above mentioned embodiments use optical systems. For example, a capacitance system or a piezoelectric system as the modulation method are applicable to the invention.

Various modification will become possible for those skilled in the art after receiving the teachings of the present disclosure without departing from the scope thereof.

What is claimed is:

1. A disc recording device for recording left stereo channel signals and right stereo channel signals on a left master disc and a right master disc respectively, comprising:

a left stereo channel signal modulate means and a right stereo channel signal modulate means for modulating the left stereo channel signals and the right stereo channel signals to be recorded respectively;

a left disc rotation means and a right disc rotation means for rotating the left master disc to record the modulated left stereo channel signals and the right master disc to record the modulated right stereo channel signals;

means for synchronizing the left disc rotation means with the right disc rotation means;

a laser means for irradiating a laser beam for recording the modulated left stereo channel signal and the modulated right stereo channel signal on the left master disc and the right master disc respectively, as the left and right master discs are rotated in synchronization with each other by the left disc rotation means and the right disc rotation means;

a left stereo channel signal light-modulate means and a right stereo channel signal light-modulate means for light-modulation of the laser beam output from the laser means in response to the modulated left stereo channel signal and the modulated right stereo channel signal output from the left stereo channel signal modulation means and the right stereo channel signal modulation means respectively; and a left optical-system and a right optical-system for recording the modulated left stereo channel signals and the modulated right stereo channel signals on predetermined positions of the left master disc and the right master disc by irradiating the discs with the laser beam corresponding to the left stereo channel light-modulated signals and the right stereo channel light-modulated signals by the left stereo channel signal light-modulate means and the right stereo channel signal light-modulate means respectively.

2. A disc recording device according to claim 1, wherein the left stereo channel signals and the right stereo channel signals are signals having a super audio-frequency signal range up to 40 kHz.

3. A disc recording device according to claim 2, wherein the left stereo channel signals and the right stereo channel signals are composed of signal frames which have a frame synchronism pattern, a users bit, an information bit, and an error correction bit per one frame.

4. A disc recording device for recording left stereo channel signals and right stereo channel signals on one face and other face of a master disc respectively, comprising:

a left stereo channel signal modulate means and a right stereo channel signal modulate means for modulation of the left stereo channel signals and the right stereo channel signals to be recorded respectively;

a rotation means for rotating the master disc in which the modulated left stereo channel signals are recorded on the one face of the master disc and the modulated right stereo channel signals are recorded on the other face of the master disc;

a laser means for outputting a laser beam to the one face and to the other face of the master disc, the master disc rotated by the rotation means to record the modulated left stereo channel signals and the modulated right stereo channel signals respectively;

a left stereo channel signal light-modulate means and a right stereo channel signal light-modulate means for light-modulation of the laser beam output from the laser means in response to the modulated left stereo channel signals and the modulated right stereo channel signals output from the left stereo channel signal modulate means and the right stereo channel signal modulate means respectively; and a left stereo channel optical-system and a right stereo channel optical-system for recording the left stereo channel signals modulated and the right stereo channel signals modulated on predetermined positions of the one face and the other face of the master disc by irradiating the disc faces with the laser beam in response to the left stereo channel light-modulated signals and the right stereo channel light-modulated signals.

5. A disc recording device according to claim 4, wherein the left stereo channel signals and the right stereo channel signals are signals having a super audio-frequency signal range up to 40 kHz.

6. A disc recording device according to claim 5, wherein the left stereo channel signals modulated and the right stereo channel signals modulated are composed of signal frames which have a frame synchronism pattern, a users bit, an information bit, and an error correction bit per one frame.

7. A method for recording left stereo channel signals and right stereo channel signals on a left master disc and a right master disc respectively, comprising:

modulating the left stereo channel signals and the right stereo channel signals to be recorded, respectively;

rotating the left master disc to record the modulated left stereo channel signals and the right master disc to record the modulated right stereo channel signals;

synchronizing the rotation of the left master disc with the rotation of the right master disc;

irradiating a laser beam for recording the modulated left stereo channel signals and the modulated right stereo channel signals on the left master disc and the right master disc during the synchronized rotation of the left and right master discs;

light-modulating the laser beam output in accordance to the modulated left stereo channel signals and the modulated right stereo channel signals; and recording the modulated left stereo channel signals and the modulated right stereo channel signals at predetermined positions on the left master disc and the right master disc by irradiating the laser beam corresponding to the left stereo channel light-modulated signals and the right stereo channel light-modulated signals.

8. A method for recording left stereo channel signals and right stereo channel signals on one face and other face of a master disc respectively, comprising:

modulating the left stereo channel signals and the right stereo channel signals to be recorded respectively;

rotating the master disc in which the modulated left stereo channel signals and the modulated right stereo channel signals are to be recorded;

outputting laser beams to the one face and the other face of the master disc to record the modulated left stereo channel signals and the modulated right stereo channel signals respectively;

light-modulating the laser beams in response to the modulated left stereo channel signals and the modulated right stereo channel signals respectively; and recording the modulated left stereo channel signals and the modulated right stereo channel signals on predetermined positions of the one face and the other face of the master disc by irradiating the laser beams in response to the left stereo channel light-modulated signals and the right stereo channel light-modulated signals.

* * * * *